(12) United States Patent
Correa

(10) Patent No.: US 10,173,711 B1
(45) Date of Patent: Jan. 8, 2019

(54) STROLLER ROCKING ASSEMBLY

(71) Applicant: Ivan Correa, Northvale, NJ (US)

(72) Inventor: Ivan Correa, Northvale, NJ (US)

( * ) Notice: Subject to any disclaimer, the term of this patent is extended or adjusted under 35 U.S.C. 154(b) by 0 days.

(21) Appl. No.: 15/704,752

(22) Filed: Sep. 14, 2017

(51) Int. Cl.
*B62B 9/22* (2006.01)
*B62B 7/04* (2006.01)

(52) U.S. Cl.
CPC ........ *B62B 9/22* (2013.01); *B62B 7/04* (2013.01); *B62B 2202/42* (2013.01)

(58) Field of Classification Search
CPC .................................................. B62B 9/22
See application file for complete search history.

(56) References Cited

U.S. PATENT DOCUMENTS

| | | | | |
|---|---|---|---|---|
| 2,566,983 | A * | 9/1951 | Coltrane | A47D 9/02 180/166 |
| 2,632,517 | A * | 3/1953 | Fraunfelder | B62B 9/22 104/162 |
| 2,689,355 | A * | 9/1954 | De Frank | A47D 9/04 16/35 R |
| 2,888,086 | A * | 5/1959 | O'Brien | B62B 9/22 104/302 |
| 3,628,620 | A * | 12/1971 | Byers | A47D 9/02 104/162 |
| D288,679 | S | 3/1987 | Moskin et al. | |
| 4,856,130 | A | 8/1989 | Berkovich | |
| 5,099,528 | A * | 3/1992 | Wadman | B62B 9/22 180/166 |
| 6,588,527 | B2 | 7/2003 | Lerner et al. | |
| 7,100,724 | B2 * | 9/2006 | Haigh | B62B 9/22 180/166 |
| 7,485,086 | B2 * | 2/2009 | Dickie | A47D 9/02 600/28 |
| 7,971,885 | B2 | 7/2011 | Sanders et al. | |
| 9,027,689 | B1 | 5/2015 | Brien et al. | |
| 9,574,647 | B2 * | 2/2017 | Tundo | A47C 3/02 |
| 2004/0212161 | A1 * | 10/2004 | Haigh | B62B 9/22 280/47.1 |
| 2008/0314665 | A1 * | 12/2008 | Sanders | B62B 9/22 180/166 |
| 2009/0064410 | A1 * | 3/2009 | Cohen | A47D 9/02 5/109 |

FOREIGN PATENT DOCUMENTS

WO    WO2014013482    1/2014

* cited by examiner

*Primary Examiner* — Erez Gurari

(57) ABSTRACT

A stroller rocking assembly for autonomously rocking a stroller includes a first receiving member, a second receiving member, a pair of drive assemblies and a support rod. The first receiving member and the second receiving members each include a base that has a top surface and a bottom surface. A perimeter wall is attached to and extends upwardly from the base. The perimeter wall has an upper edge defining an opening for receiving a stroller wheel. A power switch is electrically coupled to the drive assemblies and is capable of turning the drive assemblies on or off. When actuated, the drive assemblies move the first receiving member and the second receiving member forward and backward repeatedly a distance less than 2.0 feet. A support rod is attached to and extends between the first and second receiving members.

2 Claims, 6 Drawing Sheets

STROLLER ROCKING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to strollers and more particularly pertains to a new stroller rocker for autonomously moving a stroller back and forth.

BRIEF SUMMARY OF THE INVENTION

An embodiment of the disclosure meets the needs presented above by generally comprising a first receiving member, a second receiving member, a pair of drive assemblies and a support rod. The first receiving and the second receiving members each include a base that has a top surface and a bottom surface. A perimeter wall is attached to and extends upwardly from the base. The perimeter wall has an upper edge defining an opening for receiving the wheel of a stroller. The pair of drive assemblies is mounted onto the first receiving member and second receiving member. The drive assemblies are configured to move the first receiving member and second receiving member forward and backward repeatedly a distance of less than 2.0 feet. A power switch is electrically coupled to the drive assemblies and is capable of turning the drive assemblies on or off. A support rod is attached to and extends between the first and second receiving members.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
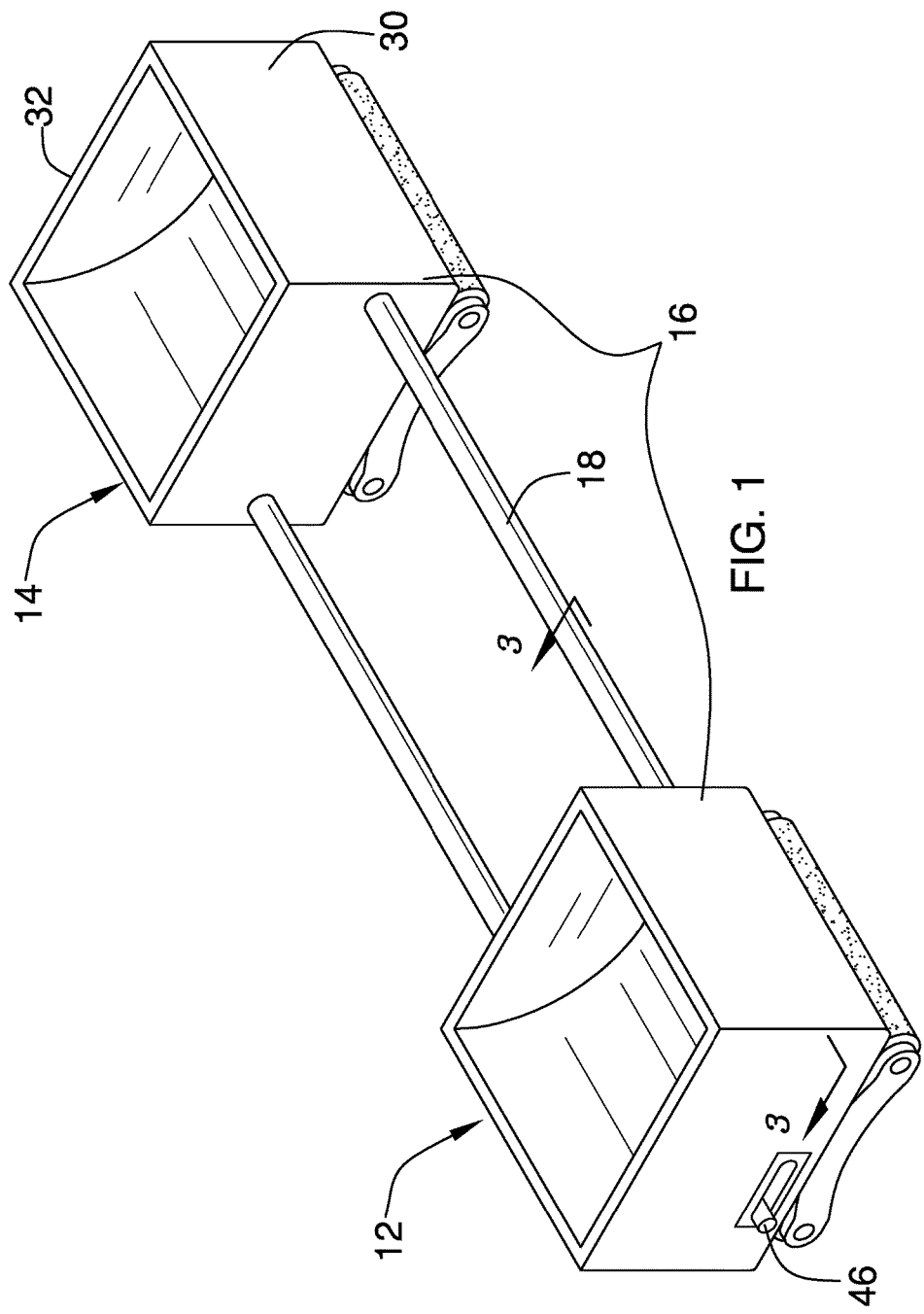
FIG. 1 is a top side view of a stroller rocking assembly according to an embodiment of the disclosure.
Figure 2:
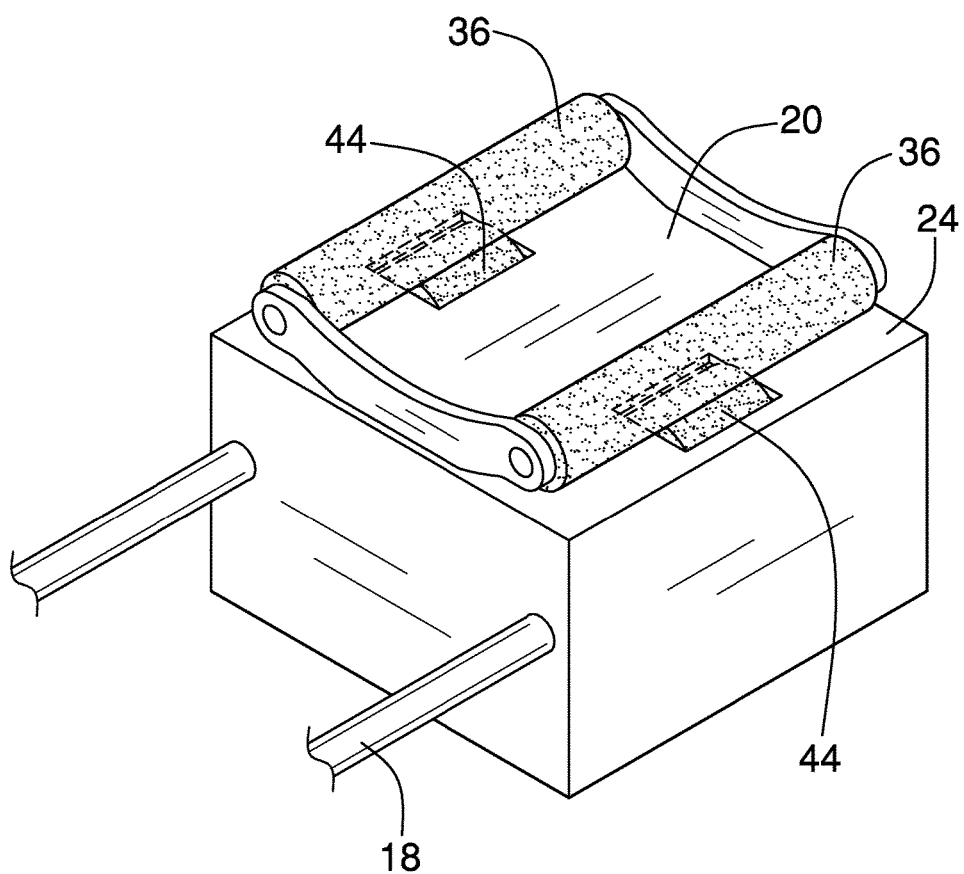
FIG. 2 is a bottom side view of an embodiment of the disclosure.
Figure 3:
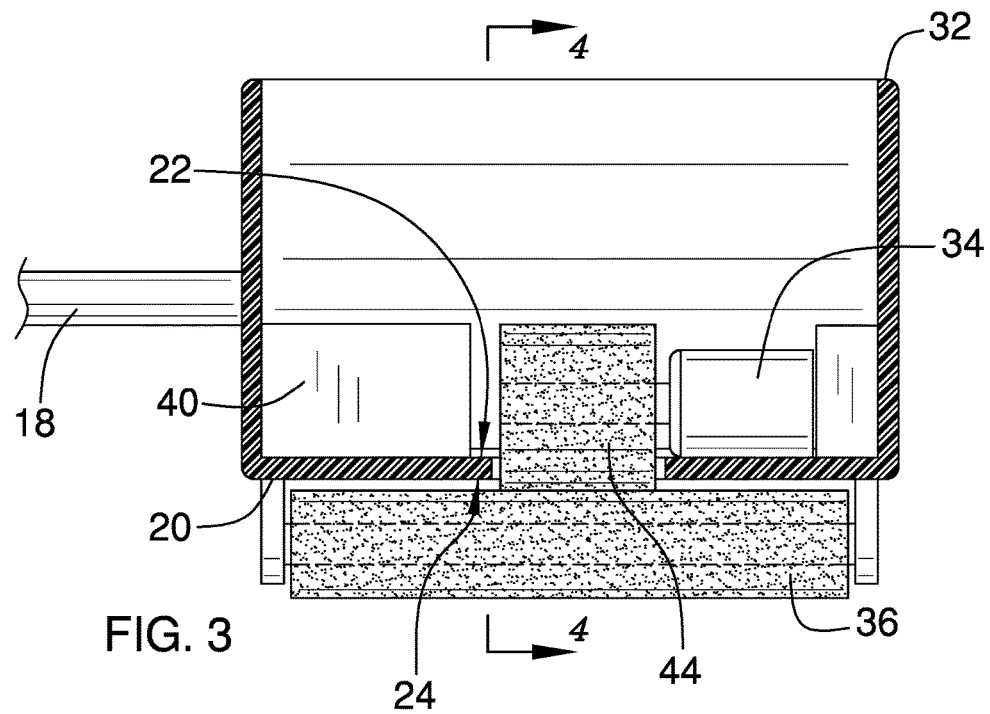
FIG. 3 is a cross-sectional view of an embodiment of the disclosure taken along the line 3-3 of FIG. 1.
Figure 4:
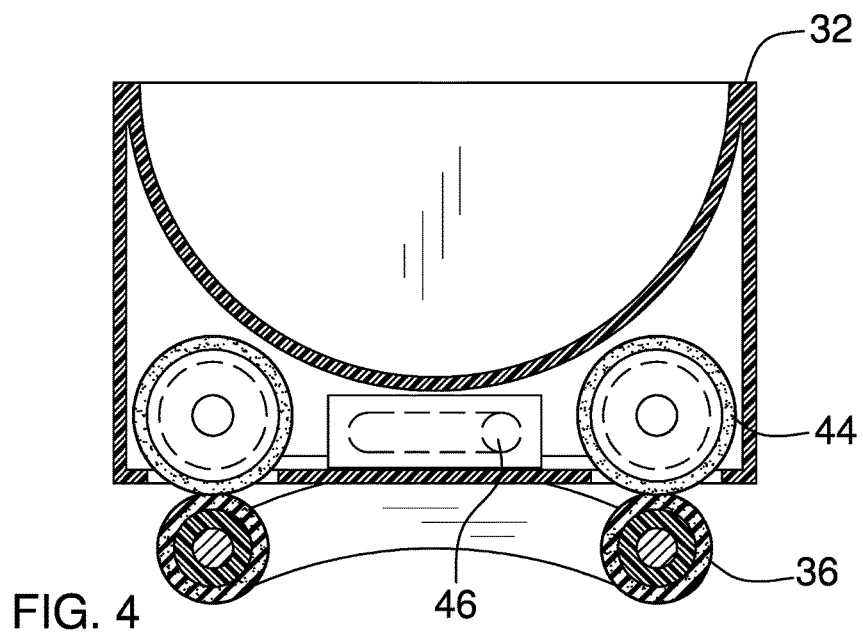
FIG. 4 is a cross-sectional view of an embodiment of the disclosure taken along the line 4-4 of FIG. 1.
Figure 5:
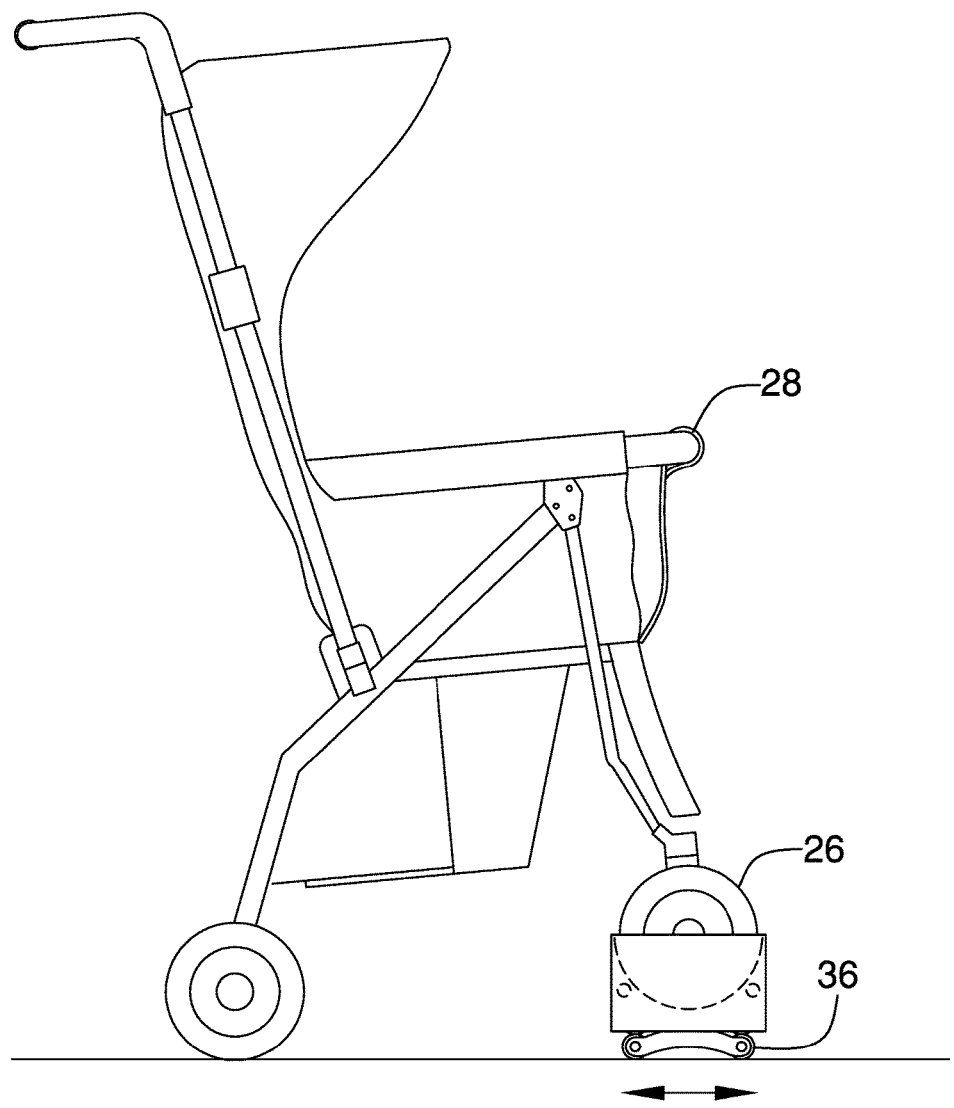
FIG. 5 is a side view of an embodiment of the disclosure.
Figure 6:
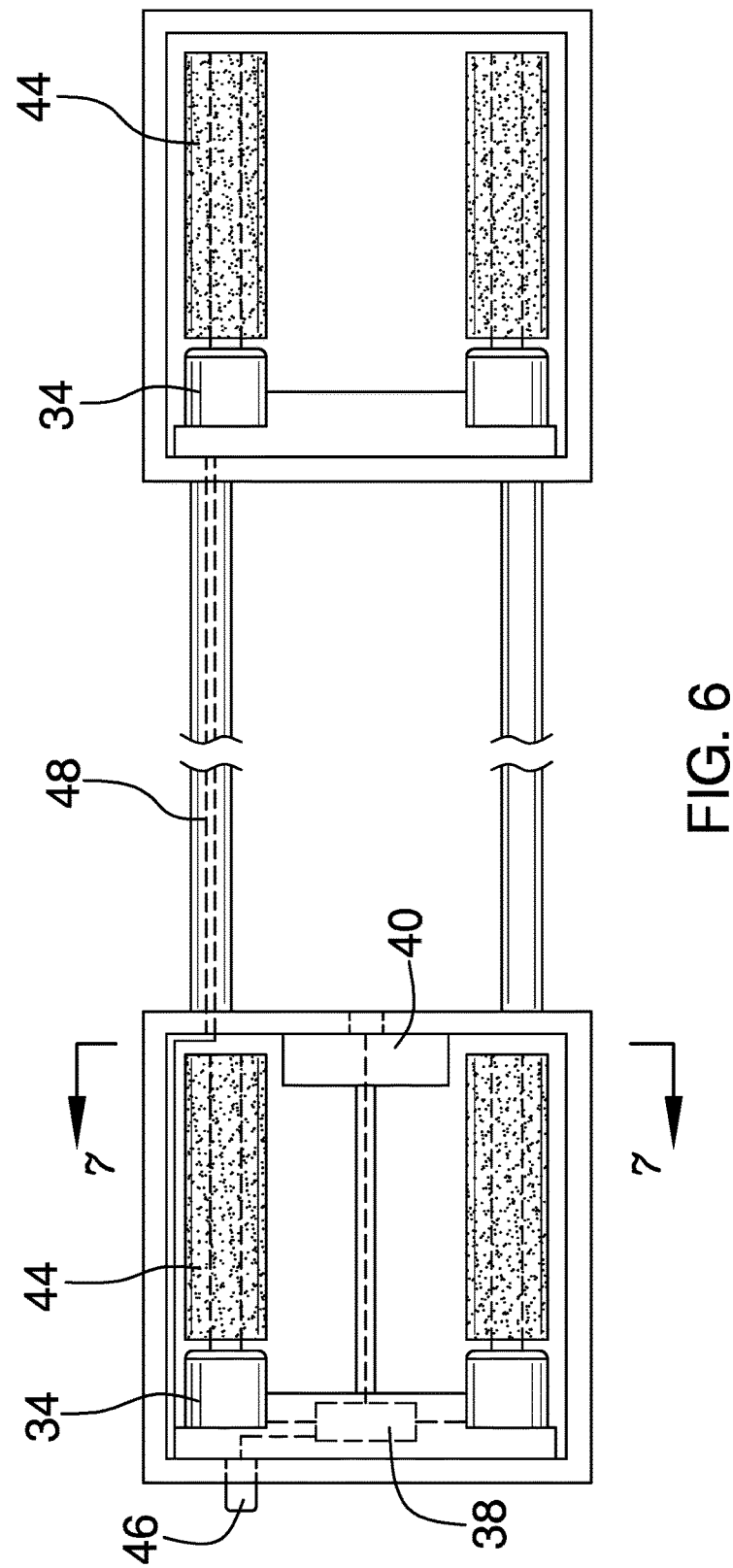
FIG. 6 is a cross-sectional view of an embodiment of the disclosure taken along the line 6-6 of FIG. 1.
Figure 7:
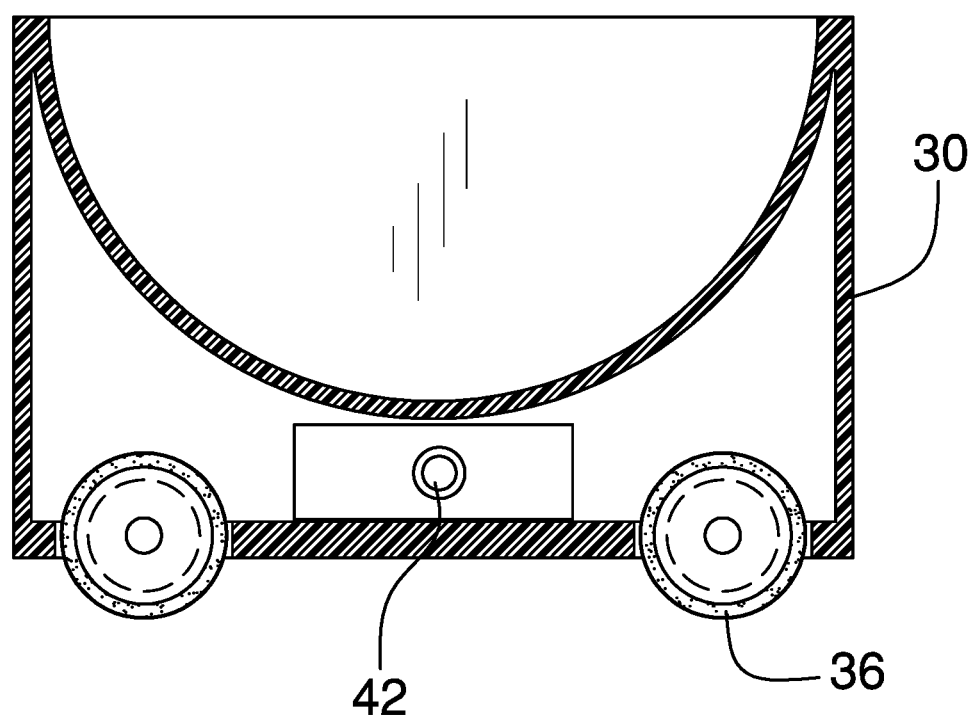
FIG. 7 is a side view of an embodiment of the disclosure.

With reference now to the drawings, and in particular to FIGS. 1 through 7 thereof, a new stroller rocker embodying the principles and concepts of an embodiment of the disclosure and generally designated by the reference numeral 10 will be described.

As best illustrated in FIGS. 1 through 7, the stroller rocking assembly 10 generally comprises a first receiving member 12, a second receiving member 14, a pair of drive assemblies 16 and a support rod 18. The first receiving member 12 and the second receiving member 14 each have a base 20 that has a top surface 22 and a bottom surface 24. The top surface 22 is concavely arcuate and configured to receive the wheel of a stroller 26. The stroller 28 is conventional and used for transporting an infant or toddler. A perimeter wall 30 is attached to and extends upwardly from the base 20. The perimeter wall 30 has an upper edge 32 defining an opening for receiving the wheel of the stroller 26.

A pair of drive assemblies 16 mounted onto each the first receiving member 12 and the second receiving members 14. The drive assemblies 16 are configured to move the first receiving member 12 and second receiving member 14 forward and backward repeatedly a distance of less than 2.0 feet. The drive assemblies each include a motor 34, a wheel 36, and a control circuit 38. The motor 34 may be mounted in the base 20 of the corresponding one of the bases 20. The wheel 36 is positioned below the base 20 and is rotatably coupled thereto. The motor 34 is mechanically coupled to the wheel 36 such that the wheel 36 rotates in a first direction and a second direction when the motor 34 is actuated to an on position. A control circuit 38 is electrically coupled to the motor 34. The control circuit 38 is programmed to repeatedly and alternatingly run the motor 34 in a first direction and then in a second direction. The control circuits 38 of the first receiving member and the second receiving member may be synchronized such that the motors 34 of each run in the same direction. The drive assembly 16 mounted on the first receiving member contains a battery 40. The battery 40 is electrically coupled to the motor 34 of the first receiving member 12 and the motor 34 of the second receiving member 14. The battery 40 may be rechargeable. If the battery 40 is rechargeable, a port 42 for recharging the battery 40 may be positioned in and through the perimeter wall 30 of the first receiving member 12.

One variation of the drive assembly 16 may replace the singular wheel 36 with a pair of drive rollers 44 and a pair of wheels 36 in each drive assembly 16. The pair of drive rollers 44 is positioned in its respective receiving member and extends below the base 20. Each pair of drive rollers 44 is mechanically coupled to the corresponding one of the motors 34. The wheels 36 are rotatably attached to the drive assembly 16 and each of the wheels 36 is positioned below and engaged with one of the drive rollers 44. The wheels 36 are engaged with the drive rollers 44 such that when the motor 34 rotates the drive rollers 44, the wheels 36 also rotate moving the assembly 10 in a first direction and then in a second direction. The wheels 36 may be tubular to keep the stroller 28 stable while autonomously rocking.

A support rod 18 is attached to and extends between the first 12 and second receiving members 14. The drive assembly 16 of the first receiving member 12 is rotatable in a direction that is parallel to the drive assembly 16 of the second receiving member 14. A power switch 46 is electrically coupled to the drive assemblies 16. The power switch 46 turns the drive assemblies 16 on or off. The power switch 46 may include wiring 48 that extends through the support rod 18 to allow electrical coupling of the drive assemblies 16 together with a single power switch 46 and to further utilize a single battery 40. Alternatively the assembly 10 may include a battery 40 in each one of the drive assemblies 16. In this variation a single power switch 46 may be used to turn on both of the drive assemblies 16.

In use, the assembly 10 may be removably attached to a pair of parallel stroller wheels 26. The stroller wheels 26 sit within the receiving members. The power switch 46 is then turned on powering the drive assemblies 16. Once actuated, the motors 34 rotate the wheels 36 forward and backwards repeatedly and alternatingly no more than 2.0 feet. This allows the stroller 28 to be rocked with minimal physical exertion by a caregiver.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A stroller rocking assembly for moving a stroller back and forth comprising:
    a first receiving member and a second receiving member, said first receiving and said second receiving members each including:
        a base having a top surface and a bottom surface;
        a perimeter wall being attached to and extending upwardly from said base, said perimeter wall having an upper edge defining an opening for receiving the wheel of the stroller;
    a pair of drive assemblies, each of said first and second receiving members having one of said drive assemblies mounted thereto, said drive assemblies being configured to move said first and second receiving members forward and backward repeatedly a distance of less than 2.0 feet;
    a support rod being attached to and extending between said first and second receiving members;
    a power switch being electrically coupled to said drive assemblies, said power switch turning said drive assemblies on or off; and
    each of said drive assemblies including
        a motor mounted in said base of a corresponding one of said bases,
        a wheel being positioned below said base and being rotatably coupled thereto, said motor being mechanically coupled to said wheel such that said wheel rotates in a first direction and a second direction when said motor is actuated to an on position,
        a control circuit being electrically coupled to said motor, said control circuit being programmed to repeatedly and alternatingly run said motor in a first direction and then in a second direction, and
        a battery being electrically coupled to said motor.

2. A stroller rocking assembly for moving a stroller back and forth comprising:
    a first receiving member and a second receiving member, said first receiving and said second receiving members each including:
        a base having a top surface and a bottom surface, said top surface being concavely arcuate and configured to receive a wheel of a stroller;
        a perimeter wall being attached to and extending upwardly from said base, said perimeter wall having an upper edge defining an opening for receiving the wheel of the stroller;
    a pair of drive assemblies, each of said first and second receiving members having one of said drive assemblies mounted thereto, said drive assemblies being configured to move said first and second receiving members forward and backward repeatedly a distance of less than 2.0 feet, each of said drive assemblies including:
        a motor mounted in said base of a corresponding one of said bases;
        a wheel being positioned below said base and being rotatably coupled thereto, said motor being mechanically coupled to said wheel such that said wheel rotates in a first direction and a second direction when said motor is actuated to an on position;
        a control circuit being electrically coupled to said motor, said control circuit being programmed to repeatedly and alternatingly run said motor in a first direction and then in a second direction;
        a battery being electrically coupled to said motor;
    a support rod being attached to and extending between said first and second receiving members, said drive assembly of said first receiving member being rotatable in a direction that is parallel to said drive assembly of said second receiving member; and a power switch being electrically coupled to said drive assemblies, said power switch turning said drive assemblies on or off.

\* \* \* \* \*